US011194076B2

(12) United States Patent
Seo et al.

(10) Patent No.: US 11,194,076 B2
(45) Date of Patent: Dec. 7, 2021

(54) LENS MODULE AND CAMERA MODULE INCLUDING THE SAME

(71) Applicant: LG INNOTEK CO., LTD., Seoul (KR)

(72) Inventors: Eun Sung Seo, Seoul (KR); Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 329 days.

(21) Appl. No.: 16/072,426

(22) PCT Filed: Jan. 26, 2017

(86) PCT No.: PCT/KR2017/000929
§ 371 (c)(1),
(2) Date: Jul. 24, 2018

(87) PCT Pub. No.: WO2017/131455
PCT Pub. Date: Aug. 3, 2017

(65) Prior Publication Data
US 2018/0364395 A1 Dec. 20, 2018

(30) Foreign Application Priority Data
Jan. 28, 2016 (KR) .................. 10-2016-0010483

(51) Int. Cl.
*G02B 1/10* (2015.01)
*G02B 26/00* (2006.01)
(Continued)

(52) U.S. Cl.
CPC ................ *G02B 1/10* (2013.01); *G02B 3/12* (2013.01); *G02B 5/005* (2013.01); *G02B 7/02* (2013.01);
(Continued)

(58) Field of Classification Search
CPC ........ G02B 13/00; G02B 1/10; G02B 26/005; G02B 3/12; G02B 5/005; G02B 7/02;
(Continued)

(56) References Cited

U.S. PATENT DOCUMENTS 9,164,206 B2    10/2015  Valley et al.
2004/0174610 A1* 9/2004  Aizenberg ........... G02B 26/004
                                                    359/665
(Continued)

FOREIGN PATENT DOCUMENTS

CN    101000385 A    7/2007
CN    101685173 A    3/2010
(Continued)

OTHER PUBLICATIONS

International Search Report in International Application No. PCT/KR2017/000929, filed Jan. 26, 2017.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

One embodiment of a lens module includes a first lens including a fluid so as to absorb incident light; and a second lens forming an interface with a part of the first lens, the second lens including a fluid so as to permit passage of the incident light therethrough, wherein the second lens defines a first optic path in a center part thereof to permit passage of the incident light therethrough, and the first light path is changed in a cross-sectional area as the interface varies, and wherein a second optical path is formed at a portion of the first lens that is located adjacent to the first optical path.

18 Claims, 4 Drawing Sheets

(51) Int. Cl.
- *H04N 5/225* (2006.01)
- *G02B 5/00* (2006.01)
- *G02B 7/02* (2021.01)
- *G02B 13/00* (2006.01)
- *G02B 3/12* (2006.01)
- *G03B 17/02* (2021.01)
- *G03B 3/10* (2021.01)

(52) U.S. Cl.
CPC ........... *G02B 13/00* (2013.01); *G02B 26/005* (2013.01); *G03B 17/02* (2013.01); *H04N 5/225* (2013.01); *H04N 5/2254* (2013.01); *G03B 3/10* (2013.01); *G03B 2205/0007* (2013.01); *G03B 2205/0053* (2013.01)

(58) Field of Classification Search
CPC ............ G03B 17/02; G03B 2205/0007; G03B 2205/0053; G03B 3/10; H04N 5/225; H04N 5/2254
See application file for complete search history.

(56) References Cited

U.S. PATENT DOCUMENTS

| | | |
|---|---|---|
| 2006/0206075 A1 | 9/2006 | Tanaka et al. |
| 2007/0217022 A1* | 9/2007 | Kuiper .................... G02B 3/14 359/666 |
| 2008/0024653 A1* | 1/2008 | Ikeda ................. H04N 5/23245 348/362 |
| 2008/0285143 A1 | 11/2008 | Batchko et al. |

FOREIGN PATENT DOCUMENTS

| | | |
|---|---|---|
| CN | 205049771 U | 2/2016 |
| JP | 2010-079096 A | 4/2010 |
| KR | 10-2006-0129780 A | 12/2006 |
| KR | 10-1175929-81 | 8/2012 |
| KR | 10-2014-0146566 A | 12/2014 |
| KR | 10-2015-0113538 A | 10/2015 |

OTHER PUBLICATIONS

Office Action dated Jun. 15, 2020 in Chinese Application No. 201780008827.9.

Notice of Allowance dated May 26, 2021 in Chinese Application No. 201780008827.9, along with its English translation.

* cited by examiner

LENS MODULE AND CAMERA MODULE INCLUDING THE SAME

CROSS-REFERENCE TO RELATED APPLICATIONS

This application is the U.S. national stage application of International Patent Application No. PCT/KR2017/000929, filed Jan. 26, 2017, which claims priority to Korean Application No. 10-2016-0010483, filed Jan. 28, 2016, the disclosures of each of which are incorporated herein by reference in their entirety.

TECHNICAL FIELD

Embodiments relate to a lens module and a camera module including the same.

BACKGROUND ART

The content described in this section merely provides background information regarding embodiments, and does not constitute the prior art.

Recently, products in fields of IT having built-in miniature digital cameras, such as mobile phones, smart phones, tablet PCs, laptops, etc., have been actively developed.

In the case of a camera module that is installed in small electronic devices such as smart phones, the camera module may include a lens module including at least one lens and a device for driving the lens module.

In addition, the camera module may include an auto-focusing device for focusing the lens module in an optical-axis direction and an optical image stabilization device for inhibiting image quality deterioration attributable to a user's hand tremor.

In addition, the camera module may include a device for adjusting the brightness of an image to be captured. The device for adjusting the brightness of an image may generally be implemented as an aperture.

However, when a general aperture is used, particularly, in a miniature camera module, incident light may be diffracted, thus deteriorating the quality of the image to be captured.

DISCLOSURE

Technical Problem

Therefore, embodiments relate to a lens module that has a simple structure compared to a general aperture and that is capable of inhibiting or greatly reducing the diffraction of incident light, and to a camera module including the lens module.

However, the objects to be accomplished by the embodiments are not limited to the above-mentioned object, and other objects not mentioned will be clearly understood by those skilled in the art to which the embodiments pertain from the following description.

Technical Solution

One embodiment of a lens module may include a first lens, including a fluid to absorb incident light, and a second lens, forming an interface with a portion of the first lens, the second lens including a fluid to permit passage of the incident light therethrough, wherein the second lens may define a first optical path in the center portion thereof to permit passage of the incident light therethrough, and the first optical path may be changed in cross-sectional area as the interface varies.

Another embodiment of a lens module may further include a first light transmission member, a second light transmission member disposed so as to be spaced apart from the first light transmission member, at least two fluids disposed between the first light transmission member and the second light transmission member, and an electrode for controlling the fluids between the first light transmission member and the second light transmission member, wherein any one of the at least two fluids may have a property of absorbing light.

One embodiment of a camera module may include the above lens module.

Advantageous Effects

Embodiments have an effect capable of adjusting the brightness of an image to be captured by controlling the optical transmittance of a lens module through control of the interface between a first lens and a second lens.

A lens module of the embodiments is capable of inhibiting or greatly reducing the diffraction of incident light compared to a configuration that uses an aperture formed of an opaque material, and is therefore capable of inhibiting or greatly reducing deterioration in sharpness and quality of an image.

BEST MODE

Figure 1:
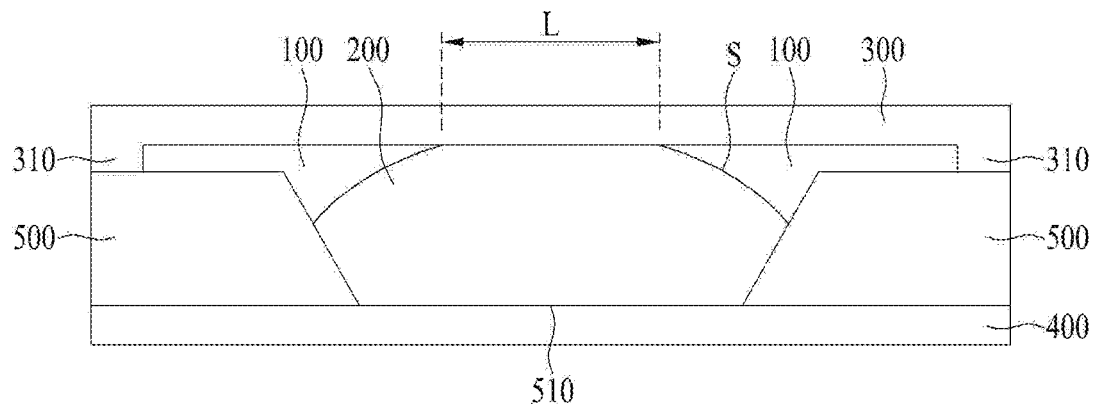
FIG. 1 is a cross-sectional view illustrating a lens module according to an embodiment.

Hereinafter, embodiments will be described in detail with reference to the accompanying drawings. While the disclosure is subject to various modifications and alternative forms, specific embodiments thereof are shown by way of example in the drawings and are explained in detail in the description. However, the disclosure should not be construed as being limited to the embodiments set forth herein, but on the contrary, the disclosure is intended to cover all modifications, equivalents, and alternatives falling within the spirit and scope of the embodiments. In the drawings, the sizes or shapes of elements may be exaggerated for convenience and clarity of description.

It may be understood that, although the terms "first," "second," etc. may be used herein to describe various elements, these elements are not to be construed as being limited by these terms. These terms are generally only used to distinguish one element from another. In addition, terms particularly defined in consideration of the construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In addition, relational terms, such as "on/upper part/above" and "under/lower part/below," are used only to distinguish between one subject or element and another subject or element, without necessarily requiring or involving any physical or logical relationship or sequence between the subjects or elements.

FIG. 1 is a cross-sectional view illustrating a lens module according to an embodiment. The lens module of the embodiment may include a first lens 100, a second lens 200, a first light transmission plate 300, a second light transmission plate 400, and a support part 500.

The first lens 100 is disposed at a front side of the lens module, on which light is incident. The first lens 100 may include a liquid, and may serve to absorb incident light. The first lens 100 may include a light-absorptive liquid.

For example, the light-absorptive liquid may be a liquid having an intrinsic property of absorbing light, a liquid containing a component such as a light-absorptive dye, or a light-absorptive oil. However, the disclosure is not limited thereto. The light-absorptive liquid may be formed using various materials, as long as the materials have a property of absorbing light.

At least a portion of the light that is incident on the light-absorptive liquid is absorbed in the light-absorptive liquid and is incapable of passing through the light-absorptive liquid region. Therefore, the first lens 100, which includes the light-absorptive liquid, may serve as an aperture that blocks the passage of light.

At this time, the interface of the first lens 100 may vary, whereby a region not filled with the light-absorptive liquid may be formed at the center of the first lens 100. This region may define a first optical path L.

In particular, as shown in FIG. 1, the interface at which the first lens 100 and the second lens 200 are in contact with each other may be changed in shape.

The first lens 100 may be formed in a hollow shape. Accordingly, the light-absorptive liquid may not be present at the center of the first lens 100, by which the first optical path L that permits the passage of incident light therethrough may be defined.

The first optical path L may be changed in cross-sectional area and diameter as the interface S between the first lens 100 and the second lens 200 varies. The first lens 100 may serve as an aperture, which will be described in detail with reference to FIGS. 2 and 3.

The second lens 200 may include a liquid, which is in contact with the first lens 100, and may serve to permit the passage of incident light therethrough.

In particular, as shown in FIG. 1, the bottom surface of the second lens 200 may be in contact with the second light transmission plate 400, and the side surface of the second lens 200, which is formed at an incline, may be in contact with the support part 500. In addition, a portion of the top surface of the second lens 200 may be in contact with the first light transmission plate 300.

The top surface of the second lens 200 may form an interface with the bottom surface of the first lens 100 through contact therewith. The shape and position of the interface may be changed. As described above, the cross-sectional area and diameter of the first optical path L may be changed as the interface S between the first lens 100 and the second lens 200 varies.

The first lens 100 and the second lens 200 may generally have a circular shape when viewed in the optical-axis direction of incident light. Therefore, the first optical path L may also have a circular shape when viewed in the optical-axis direction.

The first light transmission plate 300 may be disposed in front of the first lens 100, and may be formed of a transparent material. Therefore, incident light may reach the first lens 100 through the first light transmission plate 300, and light incident on the first light path L may directly pass through the second lens 200 without passing through the first lens 100.

The first light transmission plate 300 may be coupled to the support part 500 using an adhesive or the like. To this end, the first light transmission plate 300 may include a coupling portion 310 protruding from the side surface or the edge thereof in the downward direction.

The second light transmission plate 400 may be disposed behind the second lens 200, and may be formed of a transparent material. A portion of the incident light, which passes through the second lens 200 without being absorbed in the first lens 100, may pass through the second light transmission plate 400. In addition, a portion of the light that is incident on the first lens 100, which is not absorbed in the first lens 100, may pass through the second light transmission plate 400.

The light passing through the second light transmission plate 400 may reach an image sensor (not shown), which faces the lens module in the optical-axis direction of incident light while being spaced apart therefrom, and an image may be formed on the image sensor.

The second light transmission plate 400 may be in direct contact with the bottom surface of the second lens 200, and may serve to enable the bottom surface of the second lens 200 to maintain a constant shape without being deformed.

The support part 500 may be disposed between the first light transmission plate 300 and the second light transmission plate 400. One surface of the support part 500 may be coupled to the first light transmission plate 300, and the opposite surface thereof may be coupled to the second light transmission plate 400.

As shown in FIG. 1, the inner side surface of the support part 500 may face one side surface of the first lens and/or the second lens. The support part may include a hollow portion 510. The hollow portion 510 may have a circular shape when viewed in the optical-axis direction.

The support part 500 may be formed of an opaque material. Therefore, the light incident on the lens module may pass through the hollow portion 510, and may reach the image sensor.

The support part 500 may serve to enable the edge of the bottom surface of the first lens 100 and the side surface of the second lens 200 to maintain a constant shape without being deformed.

Figure 2:
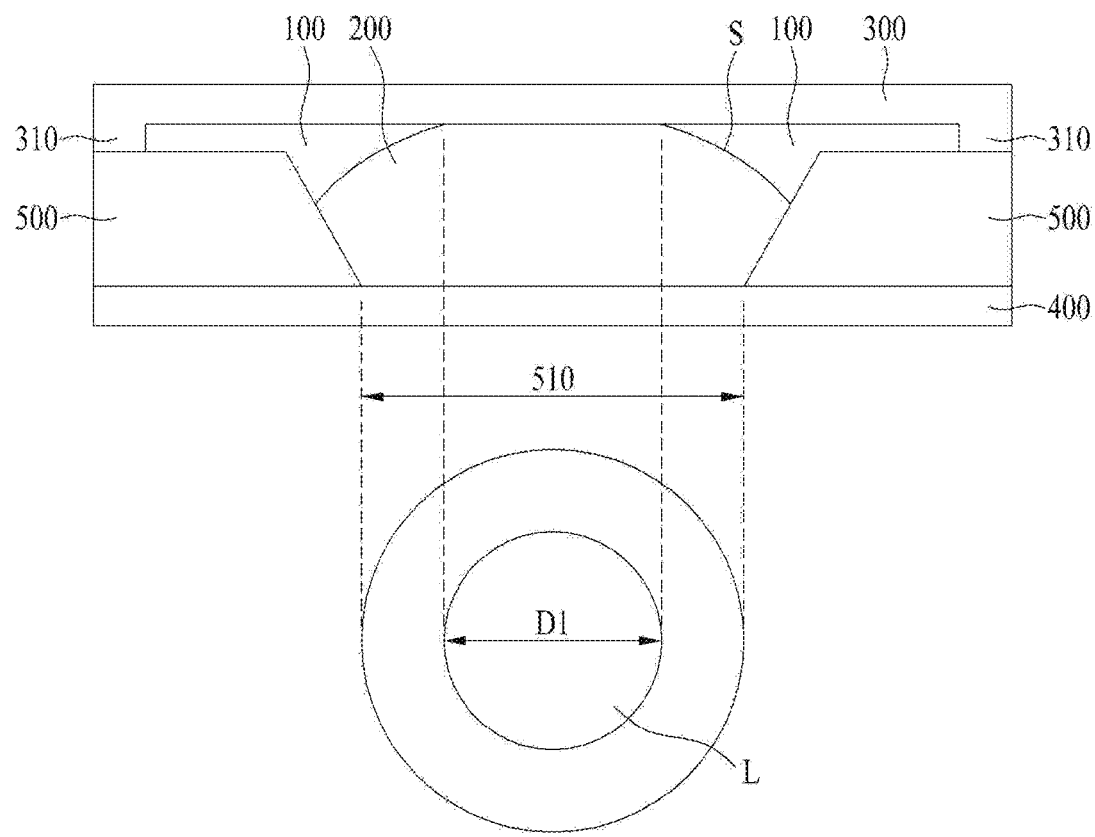
FIGS. 2 and 3 are views for explaining variation in the size of a first optical path depending on the operation of the lens module according to the embodiment.
Figure 3:
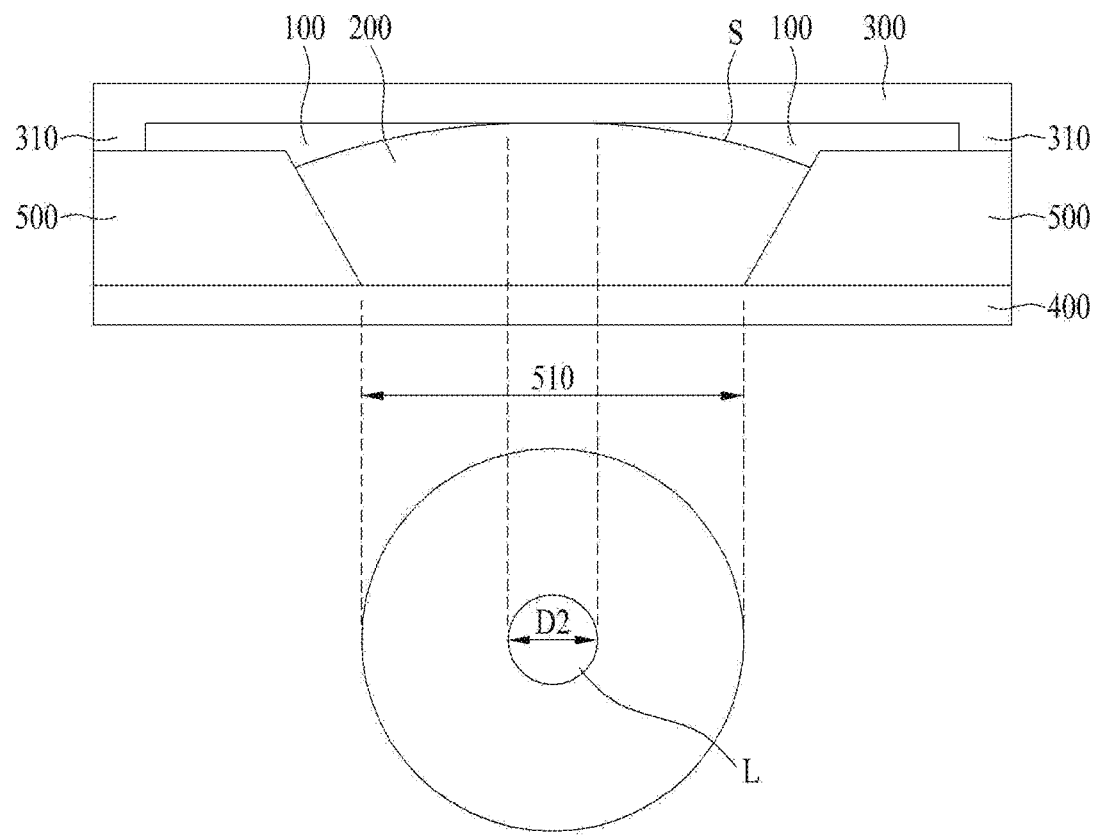

FIGS. 2 and 3 are views for explaining variation in the size of the first optical path L depending on the operation of the lens module according to the embodiment. The first lens 100 and the second lens 200 may form the interface S therebetween, at which the first lens 100 and the second lens 200 are in contact with each other.

The constituent liquid of the first lens 100 and the constituent liquid of the second lens 200 may move individually without being mixed with each other, and thus the interface S may be changed in shape.

Due to the change in the shape of the interface S, the first optical path L, which permits the passage of incident light therethrough, may be formed at the center portions of the first lens 100 and the second lens 200. The cross-sectional area and/or diameter of the first optical path L may vary depending on variation in the interface S.

In this manner, according to the lens module of the embodiment, the interface S is configured to be variable, and the size of the first optical path L may be changed by controlling the interface. Therefore, the transmittance of the incident light may vary depending on the change in the size of the first optical path L.

The interface S may be adjusted using the electric property of the first lens 100 and/or the second lens 200. The first lens 100 and/or the second lens 200 may include a liquid having an electric property, or may include a liquid that has or may have an electric property or electric charge. In addition, the support part 500 may include a first electrode, and the interface S may be adjusted by applying voltage and current to the first electrode.

In another embodiment, there may be provided a liquid storage device, which is connected with each of the first lens 100 and the second lens 200 and adjusts the amount of liquid to be supplied to each of the lenses. The interface S may be defined by adjusting the amount of liquid to be supplied to the first lens 100 and the second lens 200.

In a further embodiment, a miniature driving device for adjusting the interface S may be provided at the lens module. In yet a further embodiment, a piezoelectric element may be used. That is, the interface S may be adjusted by applying an electric signal to the piezoelectric element so as to change the shape of the piezoelectric element.

Referring to FIGS. 2 and 3, the curvature of the interface S in FIG. 2 is greater than that in FIG. 3. In addition, the cross-sectional area of the first optical path L in FIG. 2 is greater than that in FIG. 3.

That is, the diameter D1 of the first optical path L in FIG. 2 is greater than the diameter D2 of the first optical path L in FIG. 3. Therefore, the cross-sectional area of the first optical path L in FIG. 2 is greater than the cross-sectional area of the first optical path L in FIG. 3.

Therefore, as the curvature of the interface S increases, the cross-sectional area of the first optical path L may increase, and thus the transmittance of incident light, i.e. the optical transmittance, of the lens module may increase. With the increase in the optical transmittance, the brightness of the image formed on the image sensor may also increase.

Due to the above-described configuration, the first lens 100 may serve as an aperture by adjusting the cross-sectional area of the first optical path L.

According to the embodiment, the optical transmittance of the lens module may be easily controlled by adjusting the curvature of the interface S between the first lens 100 and the second lens 200, thereby adjusting the brightness of the image to be captured.

Meanwhile, the edge portion of the first optical path L corresponds to a relatively thin portion of the first lens 100, which may define a second optical path that permits the passage of incident light therethrough. The illuminance of the light passing through the second optical path may be lower than that of the light passing through the first optical path L.

Here, the illuminance of the light passing through the second optical path may be adjusted by appropriately adjusting the light-absorptive material of the light-absorptive liquid with which the first lens 100 is filled.

Therefore, an aperture having a gradation property may be formed in the second optical path by adjusting the optical transmittance with respect to the distance from the optical axis. The aperture may have a gradation property such that it becomes darker as the distance from the optical axis increases. This gradation property may decrease a reduction in resolution attributable to light diffraction.

An aperture of a general lens module is formed of an opaque material. Therefore, all of the light that is incident on this aperture is blocked, and is incapable of passing through the lens module. In this case, diffraction of incident light may occur at an end portion of the aperture formed of an opaque material.

The narrower the optical path defined by the aperture, the more intense the diffraction. The diffraction may cause deterioration in sharpness or quality of an image to be captured.

Particularly, because a lens module that is installed in mobile devices such as smart phones and a camera module including the same are very small in size, if an aperture formed of an opaque material is used, the diffraction of incident light may be intense.

However, as described above, the lens module of the embodiment includes the second optical path, which is formed at a portion of the first lens 100 that is located adjacent to the first optical path L, thus inhibiting or greatly reducing the diffraction of the incident light.

As a result, the lens module of the embodiment is capable of preventing inhibiting or greatly reducing the diffraction of incident light compared to a configuration that uses an aperture formed of an opaque material, and is therefore capable of inhibiting or greatly reducing deterioration in sharpness and quality of an image.

Figure 4:
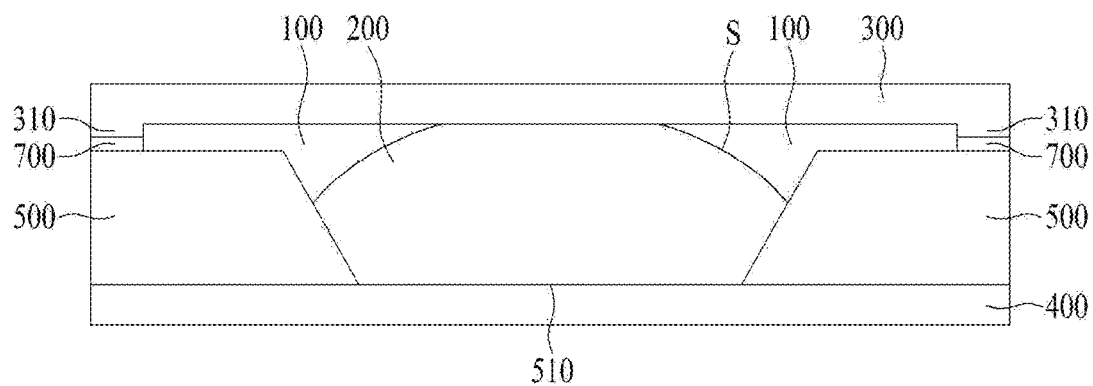
FIG. 4 is a cross-sectional view illustrating a lens module according to another embodiment.

FIG. 4 is a cross-sectional view illustrating a lens module according to another embodiment. As shown in FIG. 4, the lens module of this embodiment may further include an electrical insulation part 700. In addition, a second electrode may be formed between the electrical insulation part 700 and the first light transmission plate 300. The second electrode may be a ground terminal.

The electrical insulation part 700 may be disposed between the support part 500 and the first light transmission plate 300. One surface of the electrical insulation part 700 may be coupled to the coupling portion 310 of the first light transmission plate 300, and the opposite surface thereof may be coupled to the support part 500.

The electrical insulation part 700 may serve to electrically insulate the first light transmission plate 300 and the support part 500 from each other. Static electricity may be generated in the first light transmission plate 300. Therefore, it is required to inhibit electric devices provided in the lens module from being electrically shocked by the transfer of static electricity to the support part 500.

Therefore, the electrical insulation part 700 may serve to inhibit electric shocks attributable to static electricity generated in the first light transmission plate 300 from being applied to the interior of the lens module via the support part 500.

Figure 5:
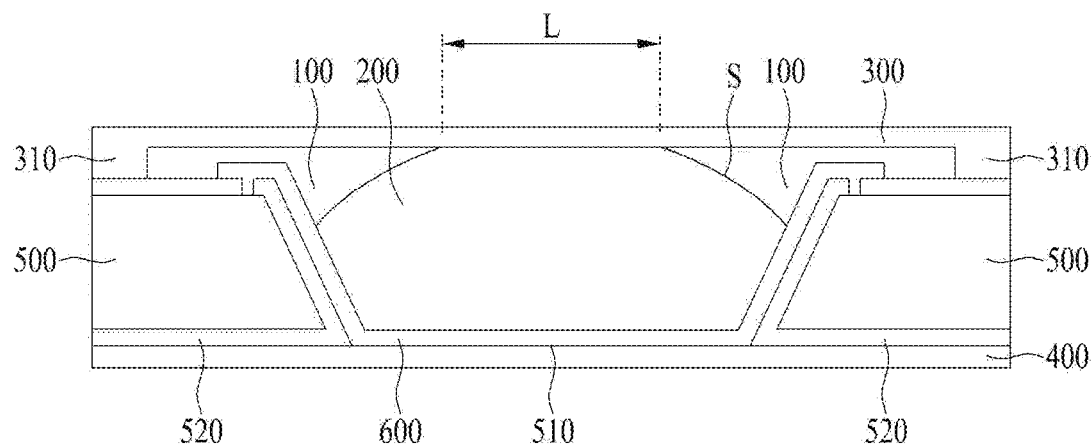
FIG. 5 is a cross-sectional view illustrating a lens module according to a further embodiment.

FIG. 5 is a cross-sectional view illustrating a lens module according to a further embodiment. As shown in FIG. 5, the lens module of this embodiment may further include a coating layer 600.

The coating layer 600 may be coated on at least a portion of the surface of the support part 500 and at least a portion of the surface of the second light transmission plate 400, and may be formed of a transparent material. In addition, the coating layer 600 may be configured so as to be coupled to at least a portion of the surface of the first lens 100 and/or the second lens 200.

The coating layer 600, for example, may serve to inhibit the support part 500 and other constituent components of the lens module from being corroded or damaged by leakage of the liquid contained in the first lens 100 and/or the second lens 200.

Therefore, the coating layer 600 may be formed of a material having excellent corrosion resistance and chemical resistance, such as, for example, a material including parylene. However, the disclosure is not limited thereto. Any material may be used, as long as it meets the requirements of the lens module of the embodiment, namely adjustment of optical transmittance, prevention of liquid leakage, excellent lubrication performance for securing smooth structural operation of the first lens 100 and the second lens 200, and improvement of chemical resistance. In addition, the coating layer 600 may have a multi-layer stacking structure in order to secure the above-described function.

Meanwhile, as shown in FIG. 5, the lens module of the embodiment may further include a plating layer 520. The plating layer 520 may be formed on the surface of the support part 500. By virtue of the plating layer 520 formed on the surface of the support part 500, a sharp edge may be accurately and precisely formed at the hollow portion 510 in the support part 500.

Figure 6:
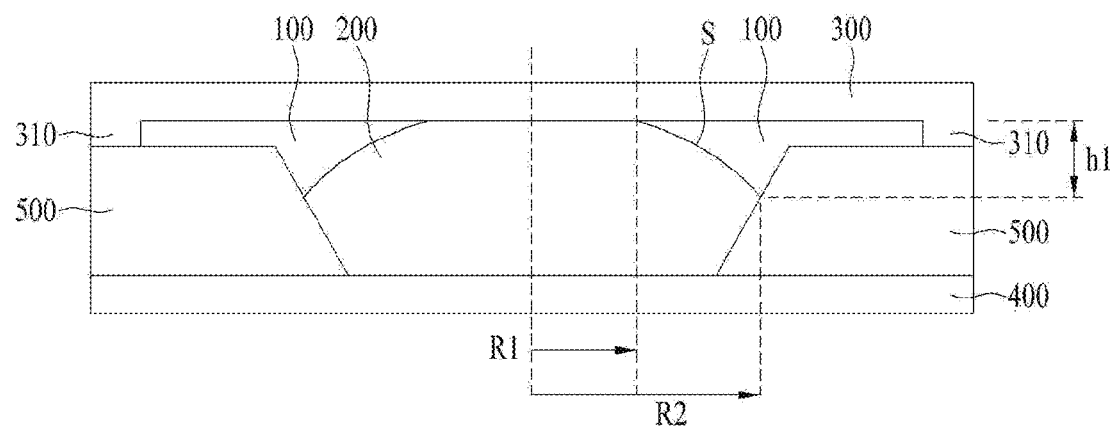
FIGS. 6 and 7 are views for explaining the relationship in shape among the constituent components of the lens module depending on the operation of the lens module.
Figure 7:
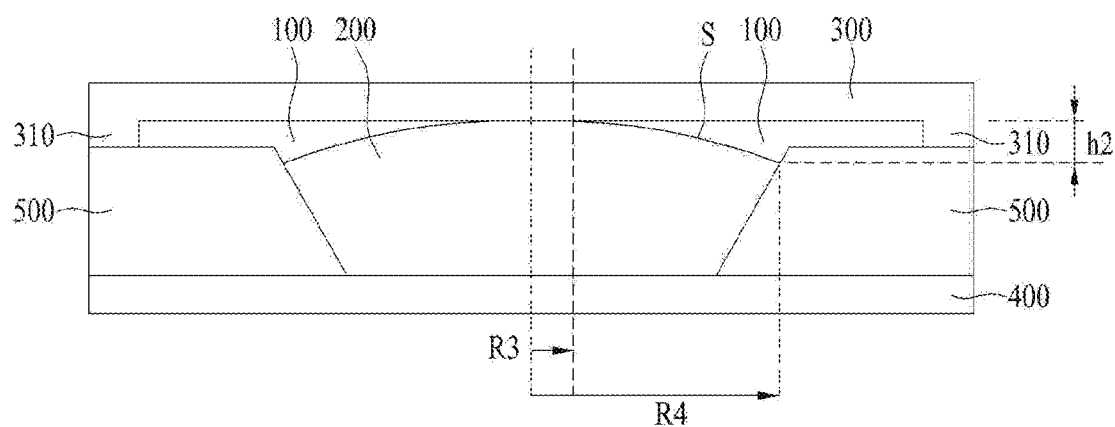

FIGS. 6 and 7 are views for explaining the relationship in shape among the constituent components of the lens module depending on the operation of the lens module. Here, the optical transmittance in FIG. 6 is higher than that in FIGS. 7.

R1 and R3 represent the radius of the first optical path L, and R2 and R4 represent the maximum radius of the second lens 200. The values of R1 to R4 may vary depending on a change in the curvature of the interface S.

In addition, h1 and h2 represent the distance measured from the bottom surface of the first light transmission plate 300 to a point corresponding to the maximum radius of the second lens 200 in the optical-axis direction. In the same manner, the values of h1 and h2 may vary depending on a change in the curvature of the interface S.

Referring to FIGS. 6 and 7, R1 to R4, h1 and h2 may have the following relationship.

R4>R2>R1>R3, h1>h2

At this time, if R1 to R4, h1 and h2 have a relationship that satisfies the following equation, the lens module of the embodiment may operate smoothly.

$$h1 \times (R2-R1) \approx h2 \times (R4-R3)$$ [Equation 1]

The lens module may be included in a camera module that is installed in mobile devices such as smart phones. The camera module may include the lens module and an image sensor, which faces the lens module in the optical-axis direction while being spaced apart therefrom.

In addition, the camera module may include an auto-focusing device for automatically adjusting a focal length and an optical image stabilization device for compensating for shaking of the lens module attributable to a user's hand tremor.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

Embodiments have an effect capable of adjusting the brightness of an image to be captured by controlling the optical transmittance of a lens module through control of the interface between a first lens and a second lens. Therefore, the embodiments have industrial applicability.

The invention claimed is:
1. A lens module, comprising:
a first lens comprising a fluid to absorb incident light;
a second lens forming an interface with a portion of the first lens, the second lens comprising a fluid to permit passage of the incident light therethrough;
a gradation part in which optical transmittance is continuously changed depending on a distance from an optical axis;
a first light transmission plate disposed in front of the first lens, the first light transmission plate being formed of a transparent material;
a second light transmission plate disposed behind the second lens, the second light transmission plate being formed of a transparent material, and
a support part disposed behind the first lens and the second lens in order to support the first lens and the second lens, the support part comprising a hallow portion,
wherein the second lens defines a first optical path in a center portion thereof to permit passage of the incident light therethrough, and the first optical path is changed in cross-sectional area as the interface varies,
wherein a second optical path is formed at a portion of the first lens that is located adjacent to the first optical path,
wherein a top surface of the first lens is in direct physical contact with the first light transmission plate,
wherein a top surface of the second lens is in direct physical contact with the first light transmission plate,
wherein a bottom surface of the second lens, opposite from the top surface of the second lens, is in direct physical contact with the second light transmission plate, and
wherein an area of direct contact between the bottom surface of the second lens and the second light transmission plate is smaller than a combined area of direct contact between the top surface of the first lens and the first light transmission plate and between the top surface of the second lens and the first light transmission plate.
2. The lens module according to claim 1, wherein the first lens absorbs the incident light and comprises at least one of light-absorptive dye and light-absorptive oil.
3. The lens module according to claim 1, wherein the support part is disposed between the first light transmission plate and the second light transmission plate and comprises one surface coupled to the first light transmission plate and an opposite surface coupled to the second light transmission plate, and
wherein a side surface of the second lens is in contact with the support part.
4. The lens module according to claim 3, wherein the support part is disposed between the first light transmission plate and the second light transmission plate in an optical-axis direction of the incident light.

5. The lens module according to claim 1, comprising:
an electrical insulation part disposed between the support part and the first light transmission plate, wherein the electrical insulation part comprises one surface coupled to the first light transmission plate and an opposite surface coupled to the support part.

6. A camera module comprising the lens module of claim 1.

7. The lens module according to claim 1, wherein illuminance of the light passing through the second optical path is lower than that of the light passing through the first optical path.

8. The lens module according to claim 1, comprising a coating layer disposed at a surface of the support part.

9. The lens module according to claim 1, comprising a plating layer formed on a surface of the support part.

10. The lens module according to claim 1, wherein a part of the first lens contacting the bottom surface of the second light transmission plate defines a diameter of the first optical path.

11. A lens module, comprising:
a first lens comprising a fluid to absorb incident light;
a second lens forming an interface with a portion of the first lens, the second lens comprising a fluid to permit passage of the incident light therethrough;
a gradation part in which optical transmittance is continuously changed depending on a distance from an optical axis;
a first light transmission plate disposed in front of the first lens, the first light transmission plate being formed of a transparent material;
a second light transmission plate disposed behind the second lens, the second light transmission plate being formed of a transparent material;
a support part disposed behind the first lens and the second lens in order to support the first lens and the second lens, the support part comprising a hollow portion; and
a coating layer coated on at least a portion of a surface of the support part and at least a portion of a surface of the second light transmission plate, the coating layer being formed of a transparent material,
wherein the second lens defines a first optical path in a center portion thereof to permit passage of the incident light therethrough, and the first optical path is changed in cross-sectional area as the interface varies,
wherein a second optical path is formed at a portion of the first lens that is located adjacent to the first optical path,
wherein a top surface of the first lens is in direct physical contact with the first light transmission plate,
wherein a top surface of the second lens is in direct physical contact with the first light transmission plate,
wherein a bottom surface of the second lens, opposite from the top surface of the second lens, is in direct physical contact with the second light transmission plate,
wherein the support part is disposed between the first light transmission plate and the second light transmission plate and comprises one surface coupled to the first light transmission plate and an opposite surface coupled to the second light transmission plate, and
wherein a side surface of the second lens is in contact with the support part.

12. The lens module according to claim 11, wherein the coating layer is coupled to at least a portion of a surface of at least one of the first lens and the second lens.

13. The lens module according to claim 12, wherein the coating layer comprises parylene.

14. A lens module, comprising:
a first light transmission plate;
a second light transmission plate disposed so as to be spaced apart from the first light transmission plate;
a gradation part in which optical transmittance is continuously changed depending on a distance from an optical axis;
at least two fluids disposed between the first light transmission plate and the second light transmission plate;
an electrode controlling the fluids between the first light transmission plate and the second light transmission plate, and
a support part disposed between the first light transmission plate and the second light transmission plate,
wherein a first fluid of the at least two fluids has a property of absorbing light,
wherein a second fluid of the at least two fluids forms a first optical path in a center portion thereof to permit passage of the incident light therethrough,
wherein a second optical path is formed at a portion of the first fluid that is located adjacent to the first optical path,
wherein a top surface of the first fluid is in direct physical contact with the first light transmission plate,
wherein a top surface of the second fluid is in direct physical contact with the first light transmission plate,
wherein a bottom surface of the second fluid is in direct physical contact with the second light transmission plate,
wherein a side surface of the second fluid is in contact with the support part, and
wherein an area of direct contact between the bottom surface of the second lens and the second light transmission plate is smaller than a combined area of direct contact between the top surface of the first lens and the first light transmission plate and between the top surface of the second lens and the first light transmission plate.

15. The lens module according to claim 14, wherein illuminance of the light passing through the second optical path is lower than that of the light passing through the first optical path.

16. The lens module according to claim 14, comprising a coating layer disposed at a surface of the support part and at least a portion of a surface of the second light transmission plate, the coating layer being formed of a transparent material.

17. The lens module according to claim 14, comprising:
an electrical insulation part disposed between the support part and the first light transmission plate,
wherein the electrical insulation part comprises one surface coupled to the first light transmission plate and an opposite surface coupled to the support part.

18. The lens module according to claim 14, comprising a plating layer formed on a surface of the support part.

* * * * *